Oct. 14, 1958    A. W. KAMMERER, JR    2,855,994
MILLING APPARATUS
Filed July 23, 1956
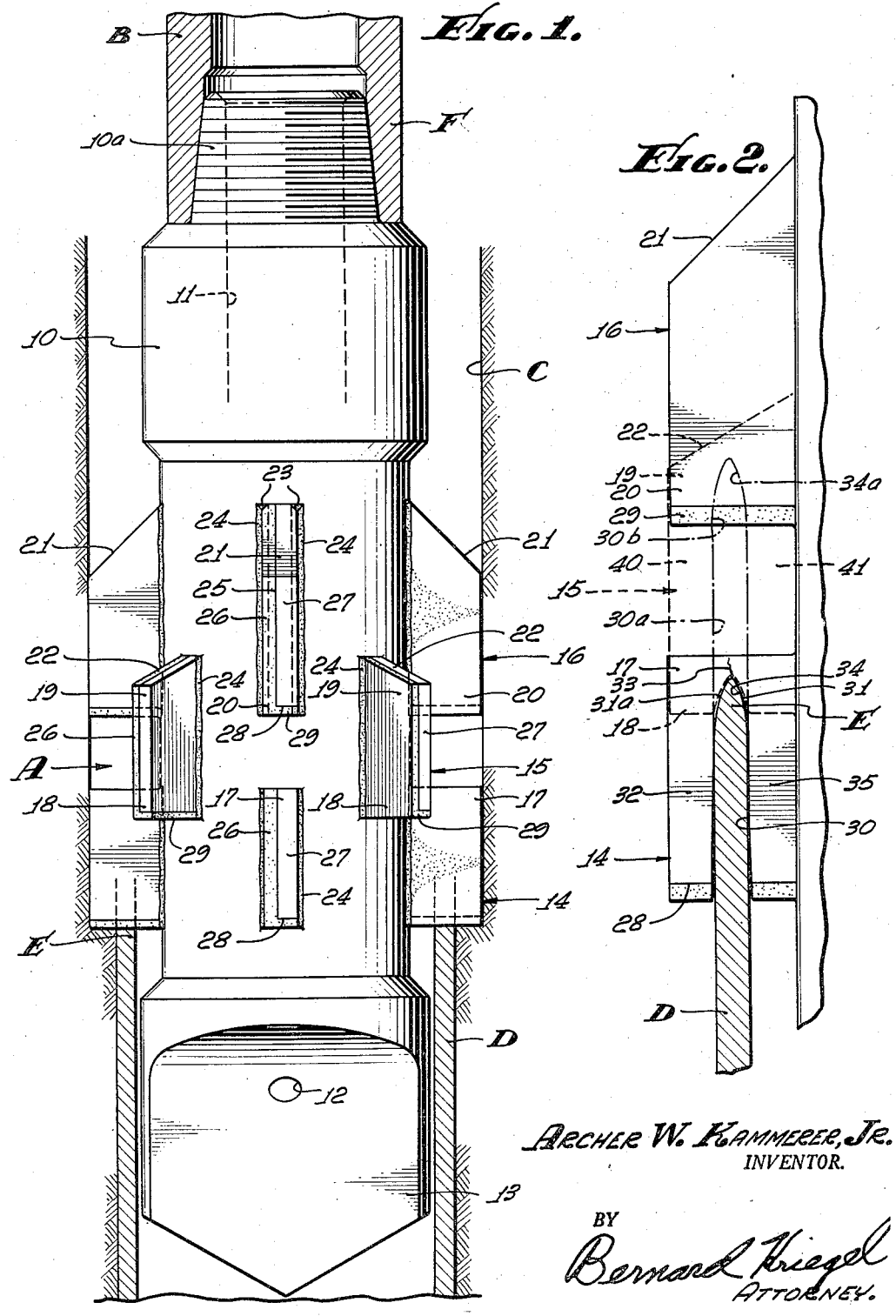
ARCHER W. KAMMERER, JR.
INVENTOR.
BY
Bernard Kriegel
ATTORNEY.

United States Patent Office 2,855,994
Patented Oct. 14, 1958

2,855,994

MILLING APPARATUS

Archer W. Kammerer, Jr., Fullerton, Calif., assignor of three-fifths to Archer W. Kammerer and one-fifth to Jean K. Lamphere, Fullerton, Calif.

Application July 23, 1956, Serial No. 599,478

7 Claims. (Cl. 164—.2)

The present invention relates to subsurface well bore equipment, and more particularly to apparatus for milling away tubular conduits, such as liners and casing, while disposed in well bores.

Milling apparatus is used for cutting away liners, casings, and similar tubular conduits, disposed in well bores. The cutting blades usually operate in a downward direction upon the severed upper end of the tubular conduit, the latter gradually wearing upwardly progressing grooves in the blades, which eventually extend throughout substantially the entire blade length. The portions of the blades remaining are entirely radially inward of the conduit and are, therefore, useless to perform any additional milling function on the conduit. The end of the conduit being operated upon usually assumes a tapered configuration, the outer portions of the blades ordinarily breaking off before the grooves are worn completely through them, leaving tapered blade portions attached to the apparatus that exert an expanding force upon the severed end of the tubular conduit and tend to wedge or flare it outwardly. Such outward flaring of the conduit may make it difficult, if not impossible, for another set of cutter blades to continue milling the conduit away.

Accordingly, it is an object of the present invention to provide milling apparatus that will not produce outward flaring of the end portion of a tubular conduit upon breaking off, or other removal, of the outward portions of the cutter blades.

Another object of the invention is to provide milling apparatus for milling away a tubular conduit disposed in a well bore in an efficient manner, and which is capable of disintegrating a comparatively long length of conduit with a single trip in the well bore.

A further object of the invention is to provide milling apparatus for cutting away a tubular conduit disposed in a well bore, which is self-centering, and which operates in a stabilized manner while performing its milling function.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a side elevational view, with associated apparatus disclosed in section, of a milling apparatus embodying the invention disposed in a well bore;

Fig. 2 is an enlarged fragmentary side elevational view of a portion of the apparatus disclosed in Fig. 1, after it has been partially worn while in use in performing a milling operation on a tubular conduit disposed in the well bore.

The apparatus A disclosed in the drawings is a milling tool that is connectible to the lower end of a string of drill pipe B extending to the top of a well bore C for the purpose of milling away a desired length of casing or liner D disposed in the well bore. The milling apparatus includes a tubular body 10 having the usual central passage 11 therethrough for receiving the drilling fluid, such as drilling mud, pumped down the drill pipe B, and for discharging the drilling fluid through one or more ports or nozzles 12 in a pilot bit portion or guide 13, of any suitable type, that may constitute the lower portion of the tool body 10. This pilot bit 13 preferably has an effective diameter that is only slightly less than the inside diameter of the tubular conduit D to be disintegrated as a result of the milling operation, for the purpose of centering the tool A within the conduit. The body 10 is secured to the drill pipe B thereabove by threading a body pin 10a into a companion threaded box F in the drill pipe.

The tubular conduit D, such as a liner or casing, is milled away by the action of longitudinally spaced sets of cutter blades 14, 15, 16 suitably secured to the body of the tool. Each set includes circumferentially spaced blades of any desired number. Adjacent sets of blades 14, 15, 16 are staggered with respect to each other, being arranged in longitudinally overlapping relation to a desired extent. The number of blades in each set can be varied, depending upon the diameter of the conduit string D being operated upon. For example, four, five, six, seven or eight blades can be provided in a set.

As disclosed, the upper portion 17 of the lower set of blades 14 is in overlapping relation to the lower portion 18 of an intermediate set of blades 15, the upper portions 19 of the intermediate set of blades 15, in turn, being in overlapping relation to the lower portions 20 of the uppermost set of blades 16. The upper ends 21, 22 of the upper and intermediate sets of blades 16, 15 may, if desired, be inclined in a downward and outward direction, to prevent the tool from hanging up in casing coupling spaces (not shown), and the like, thereabove when the tool is being elevated in the well bore C for removal therefrom.

The blades 14, 15, 16 are suitably secured to the body 10 of the tool. For example, they may be attached to the body of the tool by chamfering their longitudinal inner edges 23 and integrating them to the tool body by means of welding material 24 deposited along the edges. The leading faces 25 of the blades are hardfaced by depositing a suitable hardfacing material 26 onto their main body portions 27. For example, the hardfacing material 26 may consist of sintered tungsten carbide brazed to the leading faces 25 of the bodies 27 of the blades. The lower ends 28 of the blades also preferably have hardfacing material 29 deposited thereon.

The lower ends of the blades of each set all lie in the same plane normal to the axis of the apparatus, in order to simultaneously engage the upper end E of the tubular conduit D that is to be disintegrated. The blades 14, 15, 16 themselves are radially disposed on the body 10 and have a radial width as to extend from the periphery of the body, which has a substantially lesser diameter than the inside diameter of the tubular conduit D, to an effective diameter which is substantially greater than the outside diameter of the conduit D, so that each blade will extend outwardly beyond the external surface of the tubular conduit D being operated upon.

In the operation of the apparatus A, it is lowered in the well bore C by means of the string of drill pipe B until the pilot or guide portion 13 enters the tubular conduit D and the lower end of the lowermost set of blades 14 engages the upper end E of the liner. The drill pipe and the apparatus are then rotated at the proper speed, while suitable drilling weight is being imposed on the tool to force the lower set of blades against the upper end of the tubular conduit, drilling mud, or other drilling fluid, being pumped down the drill pipe for discharge from nozzles or ports 12 in the pilot portion and for upward passage around the tool. The blades 14 will commence cutting away the tubular conduit in a downward direction, the cuttings being flushed in an upward direction out of the hole by the circulating drilling fluid.

As the milling operation proceeds, the tubular conduit being operated upon wears longitudinal grooves 30 in the lower set of blades, which increase progressively in an upward direction. Despite the production of such longitudinal grooves, the hardfacing material 26 on the leading faces of the blades at the severed end of the tubular conduit is effective to operate upon the conduit, to insure the continued cutting away or disintegration of the tubular conduit. Actual experience has demonstrated that the end E of the tubular conduit being operated upon assumes a generally tapered form, such as shown in Fig. 2, there being an inner taper 31 inclined in an upward and outward direction, as well as an outer tapered surface 31a which is inclined in an inward and upward direction.

Assuming that the sets of blades 14, 15, 16 do not longitudinally overlap one another, as described above, eventually the longitudinal groove 30 formed in each of the lower set of blades would extend almost entirely therethrough. The tubular conduit D would not wear the groove completely through the blade 14, but would cause the portion 32 of each blade externally of the tubular conduit to break off at its upper region 33, when such upper region became sufficiently small in extent, possibly along the line 33 indicated in Fig. 2, which would then leave a tapered surface 34 on the inner portion 35 of each blade companion to the inner tapered surface 31 of the conduit. The outer portion 32 of the blade would then fall away. Accordingly, continued rotation of the tool and the imposition of drilling weight thereon would cause the companion tapered surfaces 34, 31 to wedge or flare the upper end E of the tubular conduit D outwardly, there being very little, if any, additional milling action performed thereon. Accordingly, subsequent blades of the same tool, such as blades 15, or the blades of another milling tool would not operate properly on the tubular conduit and might have difficulty in effecting its continued cutting away.

The present invention avoids the aforenoted difficulty by overlapping the sets of blades. The extent of overlapping can vary. For example, the lower portions 18 of the intermediate set of blades 15 might overlap the upper portions 17 of the lower set of blades 15 by about one-half inch. The extent of overlapping of the upper portions 19 of the intermediate set of blades with the lower portions 20 of the upper set of blades 16 may be slightly greater than a half inch, in view of the tapered upper ends 22 of the intermediate set of blades. It is important that the blades overlap sufficiently, such that a next higher set of blades will come into play and operate upon the upper end E of the conduit D, preferably with the conduit forming a groove 30a in the lower end of the next higher set of blades (such as blades 15) before the outer portions 32 of the lower worn set of blades can break off. As a matter of fact, because of the present invention, the worn set of blades does not break off, but is cut completely off by the tubular conduit.

During the milling operation on the tubular conduit, the lower set of blades 14 will progressively wear away the tubular conduit, and in doing so will have the longitudinal grooves 30 formed therein, as illustrated in Fig. 2. However, substantially before each groove could effect a breaking off of the outer portion 32 of each blade 14 from its inner portion 35, the lower ends 18 of the intermediate cutter blades 15 commence operating upon the upper end of the tubular conduit D. The rotation of the tool and the imposition of drilling weight thereon causes the tubular conduit to begin wearing grooves 30a in the intermediate set of blades, that will progressively increase in an upward direction from the lower ends of the blades 15. Such grooves 30a will be worn before the outer portions 32 of the lower set of blades 14 could break off from the inner portions 35. As a matter of fact, the intermediate set of blades 15 will relieve the lower set of blades 14 of a large portion of its milling function, and of the drilling weight being imposed on the tubular conduit, the tapered surfaces 34 on the lower blades being incapable of flaring or wedging the upper end of the tubular conduit in an outward direction, inasmuch as such outward flaring tendency is prevented by the grooves 30a worn in the intermediate set of blades. Actually, the flaring tendency does not even occur, since the outer portions 32 of the lower blades will not break off from the inner portions, the conduit wearing the lower blades away completely through its upper end, leaving the inner portions 35 with straight surfaces adapted to slide along the inner wall of the conduit D.

Thus, the longitudinal grooves 30 in the lower set of blades are worn completely therethrough from their lower to their upper ends. The milling action on the tubular conduit continues, with the intermediate set of blades 15 assuming the entire milling burden. Here again, as the tubular conduit is cut away in a downward direction, upwardly progressing longitudinal grooves 30a will be formed in the intermediate set of blades, until they are completely cut through to sever their outer portions 40 from their inner portions 41. Before the outer portions 40 can break off at their upper region, the upper set of blades 16 will commence operating upon the upper end E of the tubular conduit, which will produce upwardly progressing grooves 30b in the uppermost set of blades 16 and preventing the coengaging tapered surfaces 34a, 31 between the intermediate set of blades and the upper end of the conduit from flaring the conduit outwardly. Usually, the desired length of tubular conduit D will have been milled away before the upper set of blades 16 has been grooved completely through its length by the tubular conduit, or, at least, the tool A will be removed from the well bore before this occurs and another tool run in its place, in the event that further downward milling away of the tubular conduit is required.

The arrangement of the blades 14, 15, 16 on the milling tool not only prevents the undesirable outward flaring of the tubular conduit D, but the grooves 30, 30a, 30b produced in the cutters also serve to stabilize the apparatus, insuring its smooth functioning in performing the milling operation on the tubular conduit. Moreover, the large number of blades available on a single body insures a long effective life of the apparatus, enabling it to mill away a maximum length of tubular conduit with a single round trip in the hole.

After the tool A has completed its operation, it is elevated from the well bore C by means of a string of drill pipe B, the tapered surfaces 21, 22 on the upper ends of the blades 16, 15 insuring against hanging up of the tool in coupling spaces, and the like, in well casing, or other conduit in the well bore above the location of the tubular conduit D being disintegrated.

The inventor claims:

1. In apparatus for milling away a tubular conduit disposed in a well bore: a tubular body adapted to be secured to a drill string and having a fluid passage therein; a lower set of circumferentially spaced cutter blades carried by and extending generally radially outwardly of said body for operation upon an upwardly facing end portion of the tubular conduit; and an upper set of circumferentially spaced cutter blades carried by and extending generally radially outwardly of said body to the same extent as said lower set for operation upon the upwardly facing end of the tubular conduit; said upper set of blades being circumferentially offset with respect to said lower set of blades; the lower portions of said upper set of blades substantially overlapping the upper portions of said lower set of blades, whereby said sets of blades simultaneously operate upon the tubular conduit; said sets of blades extending outwardly beyond the periphery of the tubular conduit upon which they are adapted to operate.

2. In apparatus for milling away a tubular conduit disposed in a well bore: a tubular body adapted to be secured to a drill string and having a fluid passage therein; a lower set of circumferentially spaced cutter blades carried by and extending generally radially outwardly of said body for operation upon an upwardly facing end portion of the tubular conduit; an upper set of circumferentially spaced cutter blades carried by and extending generally radially outwardly of said body to the same extent as said lower set for operation upon the upwardly facing end of the tubular conduit; said upper set of blades being circumferentially offset with respect to said lower set of blades; the lower portions of said upper set of blades substantially overlapping the upper portions of said lower set of blades, whereby said sets of blades simultaneously operate upon the tubular conduit; said sets of blades extending outwardly beyond the periphery of the tubular conduit upon which they are adapted to operate; and a pilot member secured to said body below said lower set of blades and adapted to be disposed within the tubular conduit to center the apparatus with respect to the tubular conduit.

3. In apparatus for milling away a tubular conduit disposed in a well bore: a tubular body adapted to be secured to a drill string and having a fluid passage therein; a lower set of circumferentially spaced cutter blades carried by and extending generally radially outwardly of said body for operation upon an upwardly facing end portion of the tubular conduit; and an upper set of circumferentially spaced cutter blades carried by and extending generally radially outwardly of said body to the same extent as said lower set for operation upon the upwardly facing end of the tubular conduit; said upper set of blades being circumferentially offset with respect to said lower set of blades; the lower portions of said upper set of blades substantially overlapping the upper portions of said lower set of blades, whereby said sets of blades simultaneously operate upon the tubular conduit; said sets of blades extending outwardly beyond the periphery of the tubular conduit upon which they are adapted to operate; the leading faces of all of said blades having hardfacing material thereon throughout substantially the entire length of each blade.

4. In apparatus for milling away a tubular conduit disposed in a well bore: a tubular body adapted to be secured to a drill string and having a fluid passage therein; a lower set of circumferentially spaced cutter blades carried by and extending generally radially outwardly of said body for operation upon an upwardly facing end portion of the tubular conduit; and an upper set of circumferentially spaced cutter blades carried by and extending generally radially outwardly of said body the same extent as said lower set for operation upon the upwardly facing end of the tubular conduit; said upper set of blades being circumferentially offset with respect to said lower set of blades; the lower portions of said upper set of blades substantially overlapping the upper portions of said lower set of blades, whereby said sets of blades simultaneously operate upon the tubular conduit; said sets of blades extending outwardly beyond the periphery of the tubular conduit upon which they are adapted to operate; the upper end of said upper set of blades being inclined in a downward and outward direction.

5. In apparatus for milling away a tubular conduit disposed in a well bore: a tubular body adapted to be secured to a drill string and having a fluid passage therein; a lower set of circumferentially spaced cutter blades carried by and extending generally radially outwardly of said body for operation upon an upwardly facing end portion of the tubular conduit; an intermediate set of circumferentially spaced cutter blades carried by and extending generally radially outwardly of said body to the same extent as said lower set for operation upon the upwardly facing end portion of the tubular conduit; an upper set of circumferentially spaced cutter blades carried by and extending generally radially outwardly of said body to the same extent as said lower set for operation upon the upwardly facing end portion of the tubular conduit; said upper set of blades being circumferentially offset with respect to said intermediate set of blades; the lower portions of said upper set of blades substantially overlapping the upper portions of said intermediate set of blades, whereby said upper and intermediate sets of blades simultaneously operate upon the tubular conduit; said intermediate set of blades being circumferentially offset with respect to said lower set of blades; the lower portions of said intermediate set of blades substantially overlapping the upper portions of said lower set of blades, whereby said intermediate and lower sets of blades simultaneously operate upon the tubular conduit; all of said sets of blades extending outwardly beyond the periphery of the tubular conduit upon which they are adapted to operate.

6. In apparatus for milling away a tubular conduit disposed in a well bore: a tubular body adapted to be secured to a drill string and having a fluid passage therein; a lower set of circumferentially spaced cutter blades carried by and extending generally radially outwardly of said body for operation upon an upwardly facing end portion of the tubular conduit; an intermediate set of circumferentially spaced cutter blades carried by and extending generally radially outwardly of said body to the same extent as said lower set for operation upon the upwardly facing end portion of the tubular conduit; an upper set of circumferentially spaced cutter blades carried by and extending generally radially outwardly of said body to the same extent as said lower set for operation upon the upwardly facing end portion of the tubular conduit; said upper set of blades being circumferentially offset with respect to said intermediate set of blades; the lower portions of said upper set of blades substantially overlapping the upper portions of said intermediate set of blades, whereby said upper and intermediate sets of blades simultaneously operate upon the tubular conduit; said intermediate set of blades being circumferentially offset with respect to said lower set of blades; the lower portions of said intermediate set of blades substantially overlapping the upper portions of said lower set of blades, whereby said intermediate and lower sets of blades simultaneously operate upon the tubular conduit; all of said sets of blades extending outwardly beyond the periphery of the tubular conduit upon which they are adapted to operate; and a pilot portion secured to said body below said lower set of blades for entry into the tubular conduit to center the apparatus with respect to the tubular conduit.

7. In apparatus for milling away a tubular conduit disposed in a well bore: a tubular body adapted to be secured to a drill string and having a fluid passage therein; a lower set of circumferentially spaced cutter blades carried by and extending generally radially outwardly of said body for operation upon an upwardly facing end portion of the tubular conduit; an intermediate set of circumferentially spaced cutter blades carried by and extending generally radially outwardly of said body to the same extent as said lower set for operation upon the upwardly facing end portion of the tubular conduit; an upper set of circumferentially spaced cutter blades carried by and extending generally radially outwardly of said body to the same extent as said lower set for operation upon the upwardly facing end portion of the tubular conduit; said upper set of blades being circumferentially offset with respect to said intermediate set of blades; the lower portions of said upper set of blades substantially overlapping the upper portions of said intermediate set of blades, whereby said upper and intermediate set of blades simultaneously operate upon the tubular conduit; said intermediate set of blades being circumferentially offset with respect to said lower set of blades; the lower portions of said intermediate set of blades substantially overlapping the upper portions of said lower set of blades, whereby said intermediate and lower sets of blades operate simultaneously upon the tubular conduit; all of said sets of blades extending outwardly beyond the periphery of the tubular conduit upon which they are adapted to operate; the upper ends of said upper set of blades being inclined in a downward and outward direction; the leading faces of all of said blades having hardfacing material thereon throughout substantially the entire length of each of said blades.

References Cited in the file of this patent
UNITED STATES PATENTS

| | | |
|---|---|---|
| 2,194,267 | Brock et al. | Mar. 29, 1940 |
| 2,690,217 | Robishaw | Sept. 28, 1954 |